(12) United States Patent
Uramatsu et al.

(10) Patent No.: US 7,337,211 B2
(45) Date of Patent: Feb. 26, 2008

(54) NETWORK CONFERENCE SYSTEM AND METHOD FOR USING THE SAME

(75) Inventors: Naoyuki Uramatsu, Tokyo (JP); Shinji Takahashi, Tokyo (JP); Shinichi Shirasaka, Tokyo (JP)

(73) Assignee: Pioneer Corporation, Tokyo (JP)

( * ) Notice: Subject to any disclaimer, the term of this patent is extended or adjusted under 35 U.S.C. 154(b) by 648 days.

(21) Appl. No.: 10/282,209

(22) Filed: Oct. 29, 2002

(65) Prior Publication Data

US 2003/0101221 A1   May 29, 2003

(30) Foreign Application Priority Data

Nov. 29, 2001   (JP)   .......................... P 2001-363591

(51) Int. Cl.
    *G06F 15/16*   (2006.01)
(52) U.S. Cl. ..................................... 709/205
(58) Field of Classification Search ..................... None
    See application file for complete search history.

(56) References Cited

U.S. PATENT DOCUMENTS 5,272,698 A * 12/1993 Champion ................. 370/260
5,317,567 A * 5/1994 Champion ................. 370/267
5,383,184 A * 1/1995 Champion ................. 370/267
5,457,685 A * 10/1995 Champion ................. 370/260
5,844,979 A * 12/1998 Raniere et al. ........ 379/202.01
5,909,543 A * 6/1999 Tanaka et al. .............. 709/204
6,061,440 A * 5/2000 Delaney et al. ........ 379/202.01
6,173,314 B1 * 1/2001 Kurashima et al. ......... 709/204
6,457,043 B1 * 9/2002 Kwak et al. ................ 709/204
6,807,563 B1 * 10/2004 Christofferson et al. .... 709/204

FOREIGN PATENT DOCUMENTS

WO   WO 01/89149 A2   11/2001

* cited by examiner

*Primary Examiner*—Jason Cardone
*Assistant Examiner*—Thomas Duong
(74) *Attorney, Agent, or Firm*—Drinker Biddle & Reath LLP

(57) ABSTRACT

In a network conference system, a promoter terminal 10 has: a speaker selecting section 12 which selects the promoter terminal 10 itself or one of participant terminals 20 and 30, as a speaker terminal which is used by a speaker who makes an announcement in a conference; and a usage function controlling section 13 which, in accordance with a result of the selection by the speaker selecting section 12, controls the speaker terminal and the terminal other than the speaker terminal so that a predetermined application is available only in the speaker terminal. Further, method for using the network conference system is provided.

6 Claims, 3 Drawing Sheets

NETWORK CONFERENCE SYSTEM AND METHOD FOR USING THE SAME

BACKGROUND OF THE INVENTION

The present disclosure relates to the subject matter contained in Japanese Patent Application No. P2001-363591 filed Nov. 29, 2001, which is incorporated herein by reference in its entirety.

The present invention relates to a network conference system which includes a plurality of terminals that are connected to one another via communication lines, and which transmits and receives information for conducting a conference between the terminals. Further, the invention also relates to a method for using the network conference system.

Conventionally, a television conference system has been known as a communication tool for conducting a conference with persons who are in remote places. A television conference system includes a plurality of terminals that are connected to one another via communication lines, so that audio information including voices of users, monitor video information including monitor images of the users, and the like are transmitted and received between the terminals. A data conference system is known as a similar communication tool. A data conference system also includes a plurality of terminals that are connected to one another via communication lines, so that display information including conference materials to be displayed, drawing (pen input) information including drawing (pen input) by the users, and the like are transmitted and received between the terminals.

Recently, a network conference system has been proposed which has a configuration similar to a combination of a television conference system and a data conference system. In a network conference system, not only audio information including voices of users and monitor video information including monitor images of the users, but also display information including conference materials to be displayed, drawing (pen input) information including drawing (pen input) by the users, and the like are transmitted and received between the terminals.

FIG. 3 is a block diagram showing an example of such a network conference system. Referring to FIG. 3, the network conference system includes three terminals 40, 50, and 60 which are configured respectively by personal computers or the like, and which are connected to one another via communication lines such as public lines or private lines. The terminal 40 is a promoter terminal which is used by a promoter who promotes the conference (convocator of the conference), the terminal 50 is a participant terminal which is used by one participant (conference participant A) who participates in the conference, and the terminal 60 is a participant terminal which is used by another participant (conference participant B) who participates in the conference.

The promoter terminal 40 includes a network conference section 41, and a hard disc drive (HDD) 42 which stores conference data constituting a data file of conference materials. The network conference section 41 includes: a conference data reading/writing section 43 which reads out the conference data from the hard disc drive 42, and which adds drawing (pen input) information and the like to the conference data and writes the resulting information as proceeding information into the hard disc drive 42; and an information transmitting/receiving section 44 which performs transmission and reception of the conference data, the drawing (pen input) information, and the like with respect to the other terminals. The network conference section 41 is connected to an output device 45 which is configured by a plasma display panel (PDP) or the like, and which displays video information including the conference data, the drawing (pen input) information, and the like in the network conference section 41. The configuration of an audio information system is not shown in the figure.

Similarly, the participant terminal 50 includes a network conference section 51 and a hard disc drive 52. The network conference section 51 includes a conference data reading/writing 53 and an information transmitting/receiving section 54. The network conference section 51 is connected to an output device 55.

Similarly, the participant terminal 60 includes a network conference section 61 and a hard disc drive 62. The network conference section 61 includes a conference data reading/writing 63 and an information transmitting/receiving section 64. The network conference section 61 is connected to an output device 65.

In the thus configured network conference system, an announcement is made in all connection sites, and proceeding information which is configured by adding drawing (pen input) information (so-called handwriting information), and the like to conference data that are used in the announcements is distributed and managed equally in all the connection sites. Specifically, in the promoter terminal 40, an announcement in which the conference data stored in the hard disc drive 42 are used is made, and proceeding information which is configured by adding drawing (pen input) information and the like to the conference data is stored not only into the hard disc drive 42, but also into the hard disc drive 52 of the participant terminal 50, and the hard disc drive 62 of the participant terminal 60. In the participant terminal 50, an announcement in which the conference data stored in the hard disc drive 52 are used is made, and proceeding information which is configured by adding drawing (pen input) information and the like to the conference data is stored not only into the hard disc drive 52, but also into the hard disc drive 42 of the promoter terminal 40, and the hard disc drive 62 of the participant terminal 60. In the participant terminal 60, an announcement in which the conference data stored in the hard disc drive 62 are used is made, and proceeding information which is configured by adding drawing (pen input) information and the like to the conference data is stored not only into the hard disc drive 62, but also into the hard disc drive 42 of the promoter terminal 40, and the hard disc drive 52 of the participant terminal 50.

In such a network conference system, an announcement is made in all the terminals, and hence the role of the promoter as the chairman cannot be thoroughly fulfilled, with the result that the conference inefficiently proceeds. Since proceeding information is distributed and managed equally in all the terminals, originals of the conference materials cannot be centralizedly managed. Therefore, the system involves the risk of discrepancy or interpolation of information.

SUMMARY OF THE INVENTION

The invention is conducted in view of the above-discussed circumstances. It is an object of the invention to provide a network conference system in which the role of the promoter as the chairman can be thoroughly fulfilled, so that a conference can be prevented from inefficiently proceeding, and originals of conference materials can be centralizedly managed, so that the risk of discrepancy or interpolation of information can be eliminated.

The network conference system according to aspect 1 of the present invention is a network conference system which includes a plurality of terminals that are connected to one another via communication lines, and which transmits and receives information for conducting a conference between the terminals, wherein the plural terminals includes at least a promoter terminal which is used by a promoter who promotes the conference, and participant terminals which are used by participants in the conference, the promoter terminal includes: a speaker selecting section which selects the promoter terminal itself or one of the participant terminals, as a speaker terminal which is used by a speaker who makes an announcement in the conference; a usage function controlling section which, in accordance with a result of the selection by the speaker selecting section, controls the speaker terminal and terminals other than the speaker terminal so that a predetermined application is available only in the speaker terminal; and an information transmitting/ receiving section which transmits and receives information for conducting the conference, to terminals other than the promoter terminal, and the speaker terminal includes: a conference data storing section which stores conference data that are produced by the predetermined application, and that are used for making the announcement, the predetermined application being made available by the usage function controlling section of the promoter terminal; a conference data reading section which reads out the conference data from the conference data storing section, in order to transmit the data to terminals other than the speaker terminal; and a conference data writing section which writes at least the conference data into the conference data storing section by means of the predetermined application.

In the thus configured network conference system, the speaker selecting section of the promoter terminal selects the promoter terminal itself or one of the participant terminals, as a speaker terminal which is used by a speaker who makes an announcement in the conference. In accordance with a result of the selection by the speaker selecting section, the usage function controlling section of the promoter terminal controls the speaker terminal and terminals other than the speaker terminal so that a predetermined application is available only in the speaker terminal.

The network conference system of aspect 2 of the present invention is characterized in that, in the network conference system of aspect 1, the speaker terminal further includes an outputting section which displays the conference data that are read out from the conference data storing section.

In the thus configured network conference system, in the speaker terminal the conference data that are read out from the conference data storing section are displayed by the outputting section.

The network conference system of aspect 3 of the present invention is characterized in that, in the network conference system of aspect 1 or aspect 2, the speaker terminal further includes a temporarily storing section which temporarily stores the conference data that are read out from the conference data storing section by the conference data reading section.

In the thus configured network conference system, in the speaker terminal, the conference data that are read out from the conference data storing section by the conference data reading section are temporarily stored by the temporarily storing section.

The network conference method of aspect 4 of the present invention is a network conference method which includes a speaker selecting step for selecting a promoter terminal according itself or one of participant terminals according to claim 1, as a speaker terminal which is used by a speaker who makes an announcement in the conference, and an usage function controlling step, in accordance with a result of the selection by said speaker selecting step, for controlling said speaker terminal and terminals other than said speaker terminal so that a predetermined application is available only in said speaker terminal.

DETAILED DESCRIPTION OF THE PREFERRED EMBODIMENTS

Hereinafter, an embodiment of the invention will be described in detail with reference to the accompanying drawings.

Figure 1:
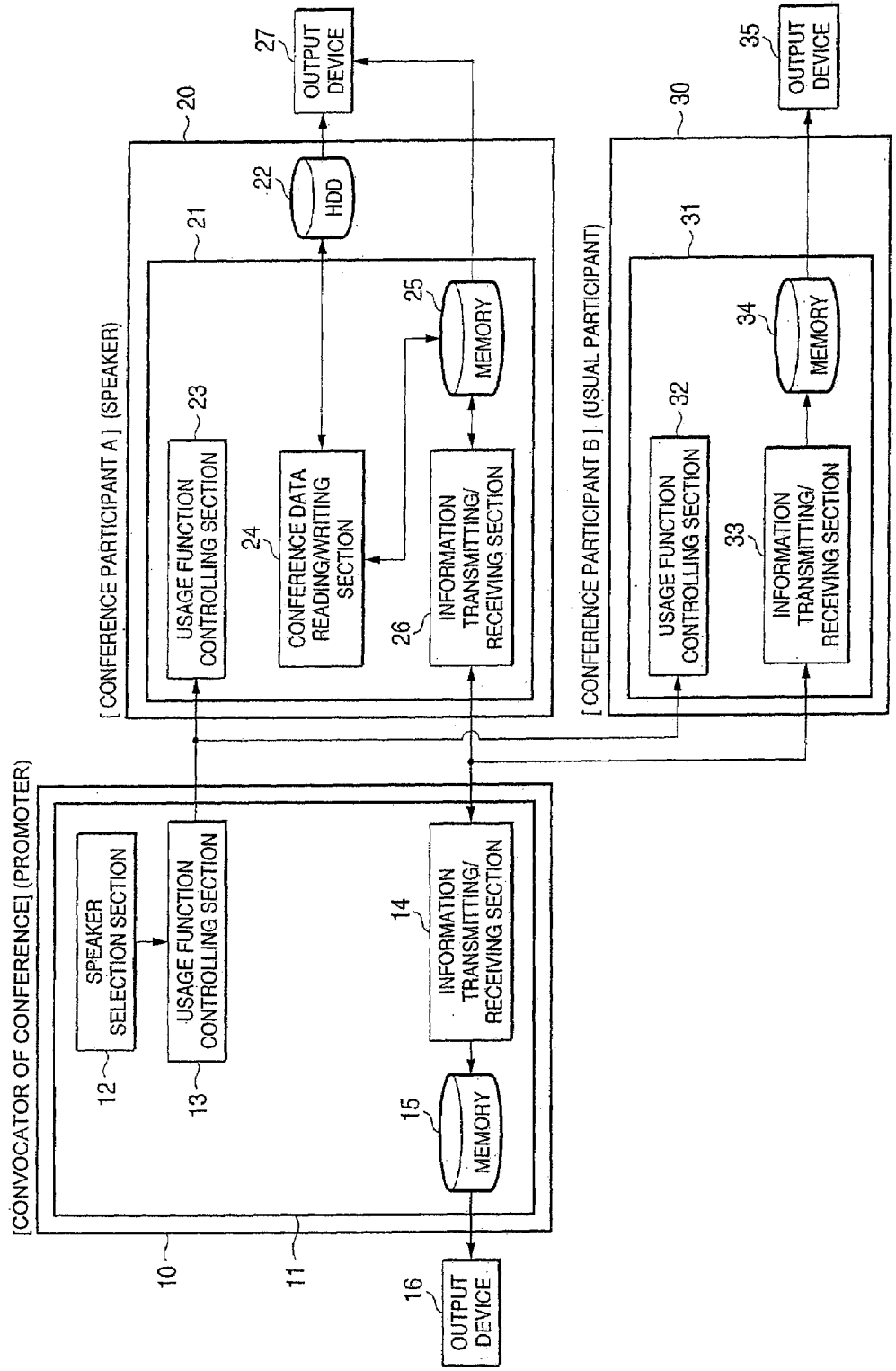
FIG. 1 is a block diagram showing the configuration of main portions of a network conference system of an embodiment of the invention.

FIG. 1 is a block diagram showing the configuration of main portions of a network conference system of the embodiment. Referring to FIG. 1, the network conference system includes three terminals 10, 20, and 30 which are configured respectively by personal computers or the like, and which are connected to one another via communication lines such as public lines or private lines. The terminal 10 is a promoter terminal which is used by a promoter who promotes the conference (convocator of the conference), the terminal 20 is a participant terminal (in the embodiment, a speaker terminal which is used by a speaker who makes an announcement in the conference) which is used by one participant A (conference participant A) who participates in the conference, and the terminal 30 is a participant terminal (in the embodiment, a usual participant terminal which is used by a usual participant who does not make an announcement in the conference) which is used by another participant B (conference participant B) who participates in the conference.

The promoter terminal 10 includes a network conference section 11. The network conference section 11 includes: a speaker selecting section 12 which selects the promoter terminal 10 itself or one of the participant terminals 20 and 30 (in the embodiment, the participant terminal 20), as a speaker terminal which is used by a speaker who makes an announcement in the conference; a usage function controlling section 13 which, in accordance with a result of the selection by the speaker selecting section 12, supplies a control signal to control the speaker terminal 20 and the terminal (the usual participant terminal 30) other than the speaker terminal 20 so that a predetermined application (in the embodiment, spreadsheet software) is available only in the speaker terminal 20; an information transmitting/receiving section 14 which receives conference data that will be described later, and bitmap image information such as drawing (pen input) information from the speaker terminal 20, receives bitmap image information such as drawing (pen input) information from the usual participant terminal 30, and transmits bitmap image information such as drawing (pen input) information to the speaker terminal 20 and the usual participant terminal 30; and a memory 15 which temporarily stores the bitmap image information that is received by the information transmitting/receiving section 14, and that is used for conducting the conference. The promoter terminal 10 includes an output device 16 which is configured by a plasma display panel (PDP) or the like, and which displays the bitmap image information supplied from the memory 15, etc. The bitmap image information is displayed in different colors so as to clearly distinguish the terminal from which the information is transmitted, i.e., the person who draws (pen-inputs) the information. The configuration of an audio information system is not shown in the figure.

The speaker terminal 20 includes a network conference section 21, and a hard disc drive (HDD) 22 serving as a conference data storing section which stores conference data that are produced by the spreadsheet software, and that are used for making the announcement. The spreadsheet software is made available by the usage function controlling section 13 of the promoter terminal 10, i.e., by a usage function controlling section 23 which will be described later. The network conference section 21 includes: the usage function controlling section 23 which receives the control signal from the usage function controlling section 13 of the promoter terminal 10, and controls the speaker terminal 20 itself so that the spreadsheet software is available in the speaker terminal 20; a conference data reading/writing section 24 which serves as a conference data reading section and a conference data writing section, which reads out the conference data from the hard disc drive 22, and which adds drawing (pen input) information and the like to the conference data and writes the resulting information as proceeding information into the hard disc drive 22 by means of the spreadsheet software; a memory 25 which temporarily stores the conference data that are read out by the conference data reading/writing section 24, and bitmap image information that is received by an information transmitting/receiving section 26 which will be described later, and that is used for conducting the conference; and the information transmitting/receiving section 26 which receives bitmap image information such as the drawing (pen input) information from the usual participant terminal 30, and transmits the conference data and bitmap image information such as drawing (pen input) information to the promoter terminal 10 and the usual participant terminal 30. The speaker terminal 20 includes an output device 27 which is configured by a plasma display panel or the like, and which displays the conference data (spreadsheet software information) supplied from the hard disc drive 22, the bitmap image information such as drawing (pen input) information supplied from the memory 25, etc. The bitmap image information is displayed in different colors so as to clearly distinguish the terminal from which the information is transmitted, i.e., the person who draws (pen-inputs) the information. The configuration of an audio information system is not shown in the figure.

The usual participant terminal 30 includes a network conference section 31. The network conference section 31 includes: a usage function controlling section 32 which receives the control signal from the usage function controlling section 13 of the promoter terminal 10, and controls the usual participant terminal 30 itself so that the spreadsheet software is available in the usual participant terminal 30; an information transmitting/receiving section 33 which receives bitmap image information such as drawing (pen input) information from the promoter terminal 10, receives the conference data and bitmap image information such as the drawing (pen input) information from the speaker terminal 20, and transmits bitmap image information such as the drawing (pen input) information to the promoter terminal 10 and the speaker terminal 20; and a memory 34 which temporarily stores the bitmap image information that is received by the information transmitting/receiving section 33, and that is used for conducting the conference. The usual participant terminal 30 includes an output device 35 which is configured by a plasma display panel or the like, and which displays the bitmap image information supplied from the memory 34, etc. The bitmap image information is displayed in different colors so as to clearly distinguish the terminal from which the information is transmitted, i.e., the person who draws (pen-inputs) the information. The configuration of an audio information system is not shown in the figure.

Also in the promoter terminal 10 and the usual participant terminal 30, there is a section corresponding to the conference data reading/writing section 24 of the speaker terminal 20. In the embodiment, an announcement is not made in the promoter terminal 10 and the usual participant terminal 30, and hence such a section is not shown in the figures.

In the thus configured network conference system of the embodiment, an announcement is made only in one connection site, and also proceeding information which is configured by adding drawing (pen input) information, and the like to conference data that are used in the announcement is managed only in the connection site. In other words, an announcement using the conference data which are prepared by means of the spreadsheet software, and which are stored in the hard disc drive 22 is made only in the speaker terminal 20 which is selected by the promoter. The proceeding information which is configured by adding drawing (pen input) information, and the like to the conference data is stored only into the hard disc drive 22 at, for example, end of the conference by means of the spreadsheet software, i.e., while maintaining the original file format.

In the network conference system of the embodiment, therefore, an announcement is made only in a terminal which is selected by the promoter. Consequently, the role of the promoter as the chairman can be thoroughly fulfilled, so that the conference can be prevented from inefficiently proceeding. Since the proceeding information is managed only in the terminal, the originals of the conference materials can be centralizedly managed, so that the risk of discrepancy or interpolation of information can be eliminated.

Figure 2:
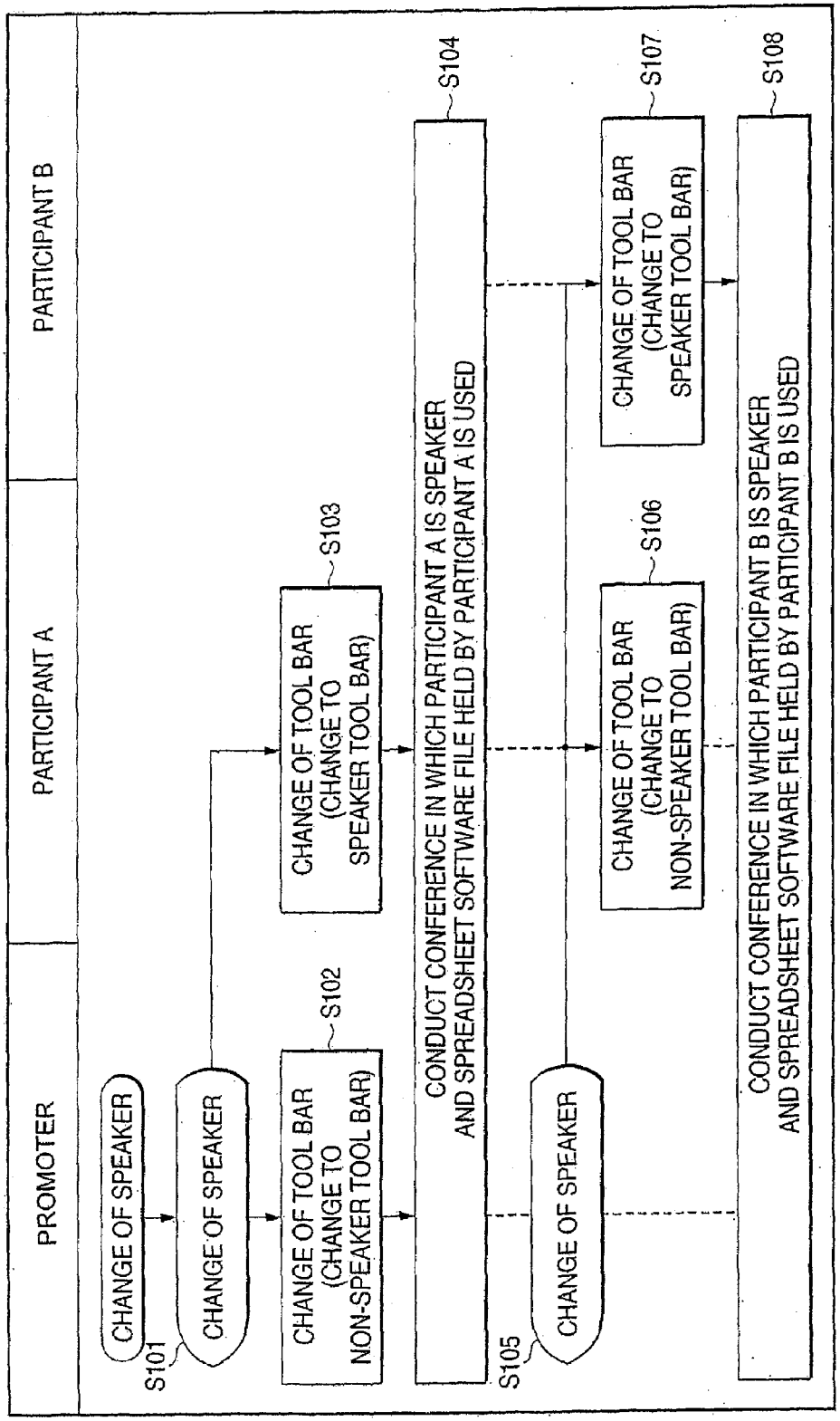
FIG. 2 is a flowchart showing an example of the operation in the case where the speaker is changed to another person in the network conference system of the embodiment of the invention.
Figure 3:
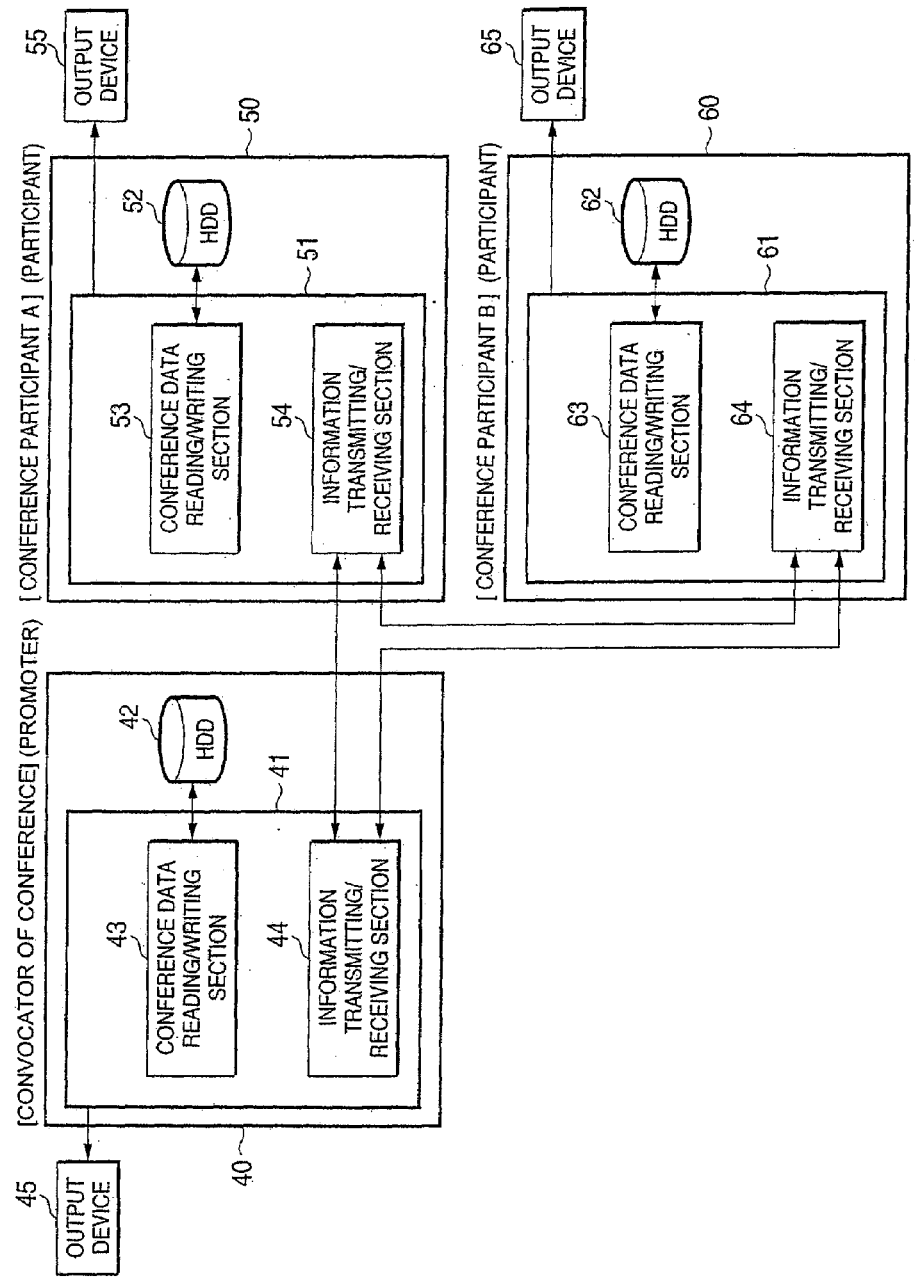
FIG. 3 is a block diagram showing an example of a network conference system.

FIG. 2 is a flowchart showing an example of the operation in the case where the speaker is changed to another person in the network conference system of the embodiment. Referring to FIG. 2, the promoter first displays a screen for changing the speaker, on the output device 16 of the promoter terminal 10, and then selects the participant A in a connection list, so that the participant terminal 20 which is used by the participant A is selected as the speaker terminal by the speaker selecting section 12 and the speaker is changed from the promoter to the participant A (step S101). Namely, a tool bar displayed on the output device 16 of the promoter terminal 10 is changed from a speaker tool bar to a non-speaker tool bar (step S102), and a tool bar displayed on the output device 27 of the participant terminal 20 is changed from a non-speaker tool bar to a speaker tool bar (step S103). As a result, only the participant terminal 20 which is used by the participant A is allowed to access the spreadsheet software information, and the conference in which the participant A is the speaker and the spreadsheet software file held by the participant A is used is conducted (step S104). Next, the promoter displays the screen for changing the speaker, on the output device 16 of the promoter terminal 10, and then selects the participant B in the connection list, so that the participant terminal 30 which is used by the participant B is selected as the speaker terminal by the speaker selecting section 12 and the speaker is changed from the participant A to the participant B (step S105). Namely, the tool bar displayed on the output device 27 of the participant terminal 20 is changed from the speaker tool bar to the non-speaker tool bar (step S106), and a tool bar displayed on the output device 35 of the participant terminal 30 is changed from a non-speaker tool bar to a speaker tool bar (step S107). As a result, only the participant terminal 30 which is used by the participant B is allowed to access the spreadsheet software information, and the conference in which the participant B is the speaker and the spreadsheet software file held by the participant B is used is conducted (step S108). In this way, the power of changing the speaker is always possessed by the promoter. In place of spreadsheet software, for example, word processing software or presentation software may be used as the application.

As apparent from the above description, according to the network conference system of the invention and method for using the same, an announcement is made only in a terminal which is selected by the promoter, and hence the role of the promoter as the chairman can be thoroughly fulfilled, so that a conference can be prevented from inefficiently proceeding. Since the proceeding information is managed only in the terminal, the originals of conference materials can be centralizedly managed, so that the risk of discrepancy or interpolation of information can be eliminated.

What is claimed is:

1. A network conference system comprising:
   a plurality of terminals that are connected to one another via communication lines and transmit and receive information for conducting a conference between said terminals,
   said terminals including:
      at least a promoter terminal which is used by a promoter who promotes the conference, and
      participant terminals which are used by participants in the conference, wherein:
   said promoter terminal
      designates said promoter terminal itself or one of said participant terminals as a speaker terminal which is used by a speaker who makes an announcement in the conference,
      said promoter terminal controls said speaker terminal and terminals other than said speaker terminal so that the announcement and a predetermined application are made available exclusively to said speaker terminal to result in only the speaker terminal having exclusive control of the announcement and the predetermined application, and
      said promoter terminal transmits and receives information for conducting the conference, to and from terminals other than said promoter terminal; and
   said speaker terminal includes:
      a conference data storing section which stores conference data and proceeding information, the conference data are produced by the predetermined application and are used for making the announcement to other terminals, the predetermined application being made available exclusively to the designated speaker terminal by said promoter terminal to result in only the designated speaker terminal having exclusive control of the predetermined application,
      a conference data reading section which reads out the conference data, in order to transmit the data to terminals other than said speaker terminal, and
      a conference data writing section which writes at least the conference data as proceeding information by means of the predetermined application.

2. The network conference system according to claim 1, wherein said speaker terminal further comprises:
   an outputting section which displays the conference data that are read out from said conference data storing section.

3. The network conference system according to claim 1, wherein
   said speaker terminal further comprises:
      a temporarily storing section which temporarily stores the conference data that are read out from said conference data storing section by said conference data reading section.

4. A network conference method for transmitting and receiving information for conducting a conference between a plurality of terminals that are connected to one another via communication lines and transmit and receive information for conducting a conference between said terminals, said terminals including at least a promoter terminal which is used by a promoter who promotes the conference, and participant terminals which are used by participants in the conference, the network conference method comprising:
   providing a promoter terminal that designates said promoter terminal itself or one of the participant terminals as a speaker terminal which is used by a speaker who makes an announcement in the conference; and
   the promoter terminal controlling said speaker terminal and terminals other than said speaker terminal so that the announcement and a predetermined application are made available exclusively to said speaker terminal to result in only the speaker terminal having exclusive control of the announcement and the predetermined application, and
   the promoter terminal transmitting and receiving information for conducting the conference, to and from terminals other than said promoter terminal; and
   storing conference data and proceeding information at a conference data storing section of said speaker terminal;
   the predetermined application producing the conference data that are used for making the announcement to other terminals, and the predetermined application being made available exclusively to the designated speaker terminal by said promoter terminal to result in only the designated speaker terminal having exclusive control of the predetermined application;
   reading out conference data by a conference data reading section of said speaker terminal in order to transmit the data to terminals other than said speaker terminal; and
   writing at least the conference data as proceeding information by means of the predetermined application, the writing being performed by a conference data writing section of the sneaker terminal.

5. The network conference method according to claim 4, further comprising:
   changing the speaker terminal from the selected terminal to one of the terminals other than the selected terminal.

6. The network conference system according to claim 1, wherein
   the proceeding information is configured by adding drawing (pen input) information to the conference data.

* * * * *